(12) United States Patent
Chou et al.

(10) Patent No.: US 9,958,676 B2
(45) Date of Patent: May 1, 2018

(54) PROJECTOR DEVICE

(71) Applicant: Industrial Technology Research Institute, Hsinchu (TW)

(72) Inventors: Ming-Chieh Chou, Kaohsiung (TW); Kuo-Chih Wang, Tainan (TW); Han-Wei Su, Tainan (TW); Yao-Hui Lee, Tainan (TW); Yi-Cheng Chen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days. days.

(21) Appl. No.: 14/869,972

(22) Filed: Sep. 29, 2015

(65) Prior Publication Data

US 2016/0187648 A1    Jun. 30, 2016

(30) Foreign Application Priority Data

Dec. 24, 2014   (TW) .............................. 103145222 A

(51) Int. Cl.
*G02B 27/14*      (2006.01)
*G02B 27/01*      (2006.01)
(Continued)

(52) U.S. Cl.
CPC ..... *G02B 27/0101* (2013.01); *G02B 27/1066* (2013.01); *G02B 27/149* (2013.01);
(Continued)

(58) Field of Classification Search
CPC ............................ G02B 27/01; G02B 27/0101; G02B 27/0149; G02B 2027/0136;
(Continued)

(56) References Cited

U.S. PATENT DOCUMENTS 6,714,331 B2    3/2004  Lewis et al.
7,903,048 B2    3/2011  Yanagisawa
(Continued)

FOREIGN PATENT DOCUMENTS

CN    101868750    10/2010
CN    102791510    11/2012
(Continued)

OTHER PUBLICATIONS

Chao et al., "Development of a micromirror based laser vector scanning automotive HUD," 2011 International Conference on Mechatronics and Automation (ICMA), Aug. 7-10, 2011, pp. 75-79.
(Continued)

*Primary Examiner* — Stephone B Allen
*Assistant Examiner* — Travis Fissel
(74) *Attorney, Agent, or Firm* — JCIPRNET

(57) ABSTRACT

A projector device is provided. The projector device includes a projector unit, an optical beam splitting module and a first image forming element. The projector unit forms a beam projecting image. The horizontal projection width of the beam projecting image is smaller than the vertical projection width of the beam projecting image. The optical beam splitting module projects one or multiple projection sub-images according to the beam projecting image. The projection sub-images are projected to the first image forming element to form one or multiple projection images. Thus, the projector device obtains multiple projection images from a single image source, and the placement of the image forming elements in the projector unit may be adjusted to obtain the projection images with the best image ratios and the best resolutions. The projector device may be suitable for a head up display.

18 Claims, 9 Drawing Sheets

(51) Int. Cl.
*G03B 21/28* (2006.01)
*G02B 27/10* (2006.01)
*H04N 9/31* (2006.01)
*G03B 21/26* (2006.01)
*G03B 21/20* (2006.01)

(52) U.S. Cl.
CPC ............ *G03B 21/26* (2013.01); *G03B 21/28* (2013.01); *H04N 9/3129* (2013.01); *H04N 9/3135* (2013.01); *H04N 9/3141* (2013.01); *H04N 9/3155* (2013.01); *G03B 21/2033* (2013.01)

(58) Field of Classification Search
CPC ...... G02B 2027/014; G02B 2027/0141; G02B 2027/154
USPC ........... 359/629, 630, 631, 633, 13, 14, 627; 340/905, 980
See application file for complete search history.

(56) References Cited

U.S. PATENT DOCUMENTS

| | | |
|---|---|---|
| 7,961,117 B1 | 6/2011 | Zimmerman et al. |
| 8,262,232 B2 | 9/2012 | Horiuchi et al. |
| 8,395,633 B2 | 3/2013 | Kurozuka |
| 8,422,137 B2 | 4/2013 | Kikuchi et al. |
| 8,681,143 B2 | 3/2014 | Sugiyama et al. |
| 8,786,519 B2 | 7/2014 | Blumenfeld et al. |
| 2006/0071877 A1 | 4/2006 | Kanamori et al. |
| 2008/0218870 A1 | 9/2008 | Lind et al. |
| 2009/0262309 A1* | 10/2009 | Yamauchi .......... G02B 27/1046 353/37 |
| 2010/0214635 A1* | 8/2010 | Sasaki ................ G02B 27/0101 359/15 |
| 2010/0321170 A1* | 12/2010 | Cooper .................. G02B 27/01 340/425.5 |
| 2012/0002256 A1* | 1/2012 | Lacoste .............. G02B 27/0081 359/9 |
| 2012/0313909 A1* | 12/2012 | Ishida .................. G02B 26/101 345/207 |
| 2013/0063754 A1* | 3/2013 | Saisho ............... G02B 26/0858 358/1.13 |
| 2014/0268353 A1* | 9/2014 | Fujimura ........... G02B 27/0101 359/630 |

FOREIGN PATENT DOCUMENTS

| | | |
|---|---|---|
| CN | 102819108 | 12/2012 |
| CN | 103376626 | 10/2013 |
| JP | 2006001377 | 1/2006 |
| TW | 289801 | 11/1996 |
| TW | M279528 | 11/2005 |
| TW | 201219828 | 5/2012 |
| TW | 201409077 | 3/2014 |
| TW | 201441664 | 11/2014 |

OTHER PUBLICATIONS

Okumura et al., "Hyperrealistic head-up-display for automotive application," 2011 IEEE International Conference on Consumer Electronics (ICCE), Jan. 9-12, 2011, pp. 875-876.

Tangmanee et al., "Effects of guided arrows on head-up display towards the vehicle windshield," 2012 Southeast Asian Network of Ergonomics Societies Conference (SEANES), Jul. 9-12, 2012, pp. 1-6.

Charissis et al., "Evaluation of Prototype Automotive Head-Up Display Interface: Testing Driver's Focusing Ability through a VR Simulation," 2007 IEEE Intelligent Vehicles Symposium, Jun. 13-15, 2007, pp. 560-565.

Park et al., "Development of circumstance-based variable information structure for head up display in a car," 2011 3rd International Conference on Data Mining and Intelligent Information Technology Applications (ICMiA), Oct. 24-26, 2011, pp. 127-130.

"Office Action of China Counterpart Application," dated Jul. 13, 2017, p. 1-p. 7.

* cited by examiner

PROJECTOR DEVICE

CROSS-REFERENCE TO RELATED APPLICATION

This application claims the priority benefit of Taiwan application serial no. 103145222, filed on Dec. 24, 2014. The entirety of the above-mentioned patent application is hereby incorporated by reference herein and made a part of this specification.

TECHNICAL FIELD

The disclosure relates to a projector device.

BACKGROUND

When driving a vehicle, the driver needs to be aware of a variety of driver information when the vehicle is going at a high speed, so as to avoid accidents. Usually, the driver information is displayed on the dashboard of the vehicle. However, when the vehicle is going at a high speed, an accident may occurs because the driver needs to bow his/her head to check the driver information on the dashboard. Thus, many vehicles currently provide a head up display (HUD) mounted on the windscreen panel in the front of the vehicle to display the drive information, such as speed, gas consumption, navigation information, and around view, etc., so that the driver does not have to bow his/her head to see the important information for operating the vehicle and reduce the frequency of checking the dashboard, thereby preventing interruption of attention and loss control of situation awareness. By adopting the HUD technology for vehicles, driving security can be improved, and car accidents can be reduced. Thus, several advanced countries have been making efforts in the development of relevant fields.

When it comes to the current projection technology, the HUDs are categorized into "LED reflective" type and "LCD imaging" type. However, the two types of HUDs merely display the driver information with a single display screen, and is unable to provide a plurality of projection images having preferable aspect ratios and resolutions by using a single image source.

SUMMARY

The disclosure provides a projector device. The projector device is capable of generating one or a plurality of projection images by using a single image source and making the projection images projected on the real image forming element have preferable aspect ratios and resolutions by adjusting a projecting angle of a projector unit.

The disclosure provides a projector device. The projector device includes a projector unit, an optical light-splitting module, and a first image forming element. The projector unit is configured to form a light beam projecting image. A horizontal projection width of the light beam projecting image is smaller than a vertical projection width of the light beam projecting image. The optical light-splitting module projects one or a plurality of projection sub-images according to the light beam projecting image. The projection sub-images are respectively projected to the first image forming element to form one or a plurality of projection images.

The disclosure provides a projector device. The projector device includes a projector unit, a reflection element, a first image forming element and a second image forming element. The projector unit forms a light beam projecting image. The reflection element reflects a light beam with the light beam projecting image. The first image forming element is arranged within a light path of the reflected light beam projecting image, so that the light beam projecting image is projected through the first image forming element to form a projection image. The second image forming element is arranged within the light path of the reflected light beam projecting image, so that the projection image is formed a virtual image on the second image forming element.

Based on the above, the projector device of the embodiments of the disclosure has the optical light-splitting module, so as to generate the multiple projection images by using one image source. In addition, the projector device is able to provide projection images with preferable image aspect ratios and resolutions by adjusting the projecting angle of the projector unit.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Head-up displays (HUD) have just been introduced to automobile electronics. It is still rare that the HUD uses a single image source to generate a plurality of projection images. Thus, the embodiments of the disclosure provide a projector device using an optical light-splitting module to split a single beam projecting image transmitted by a projector unit into three projection images and then using an imaging lens to convert the projection images into a plurality of projection sub-images that are virtual images with focal points at two or three meters from human eyes, so as to project three different image information at the same time for the user's viewing. In addition, by adjusting a light emitting angle of a scanning lens of the projector unit in the projector device, the user is allowed to view more image information in an optimal display area, and the projection sub-images have preferable aspect ratios and resolutions. In the following, details of the embodiments of the disclosure are provided.

Figure 1A:
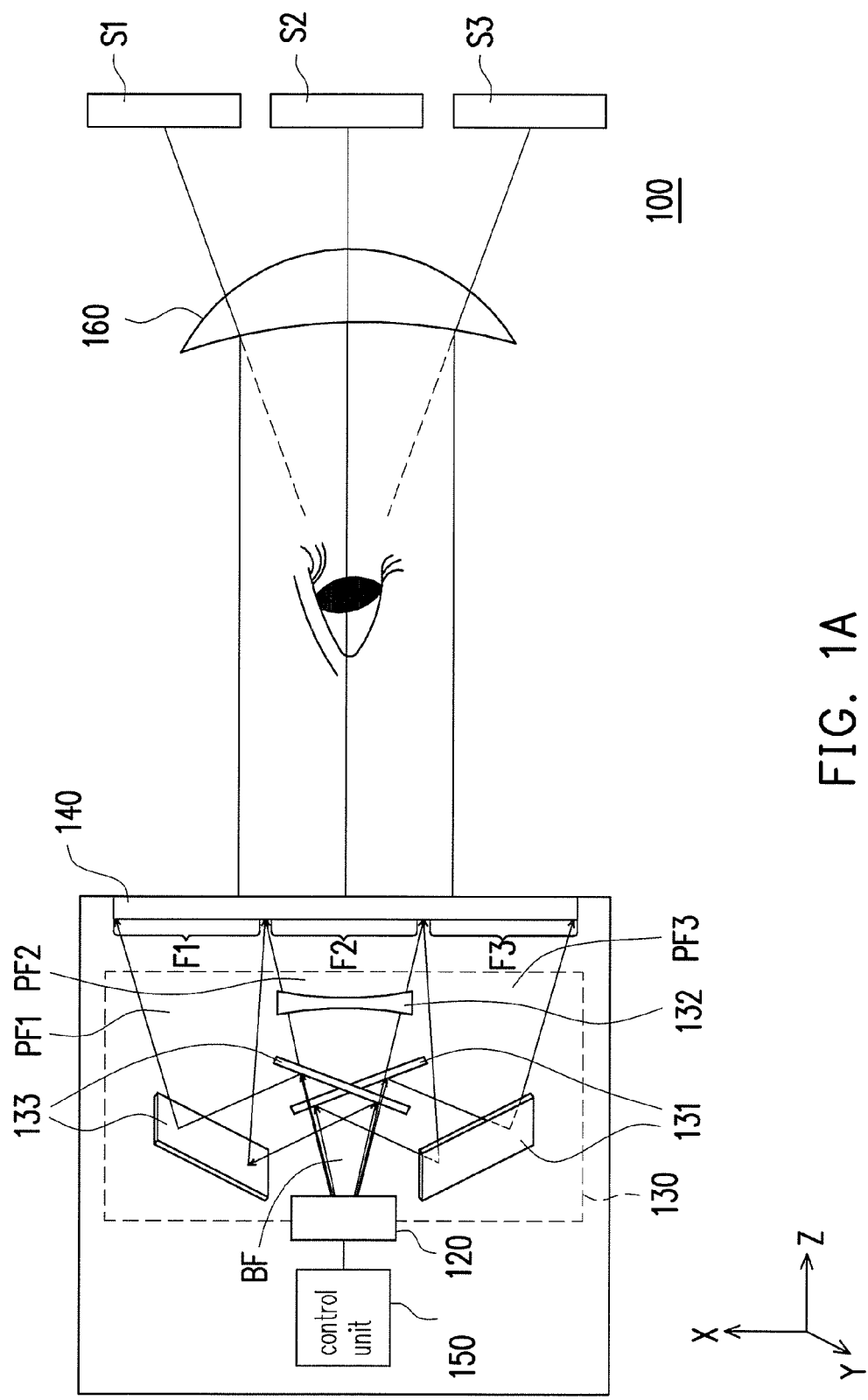
FIGS. 1A and 1B are schematic views illustrating a projector device according to an embodiment of the disclosure.
Figure 1B:
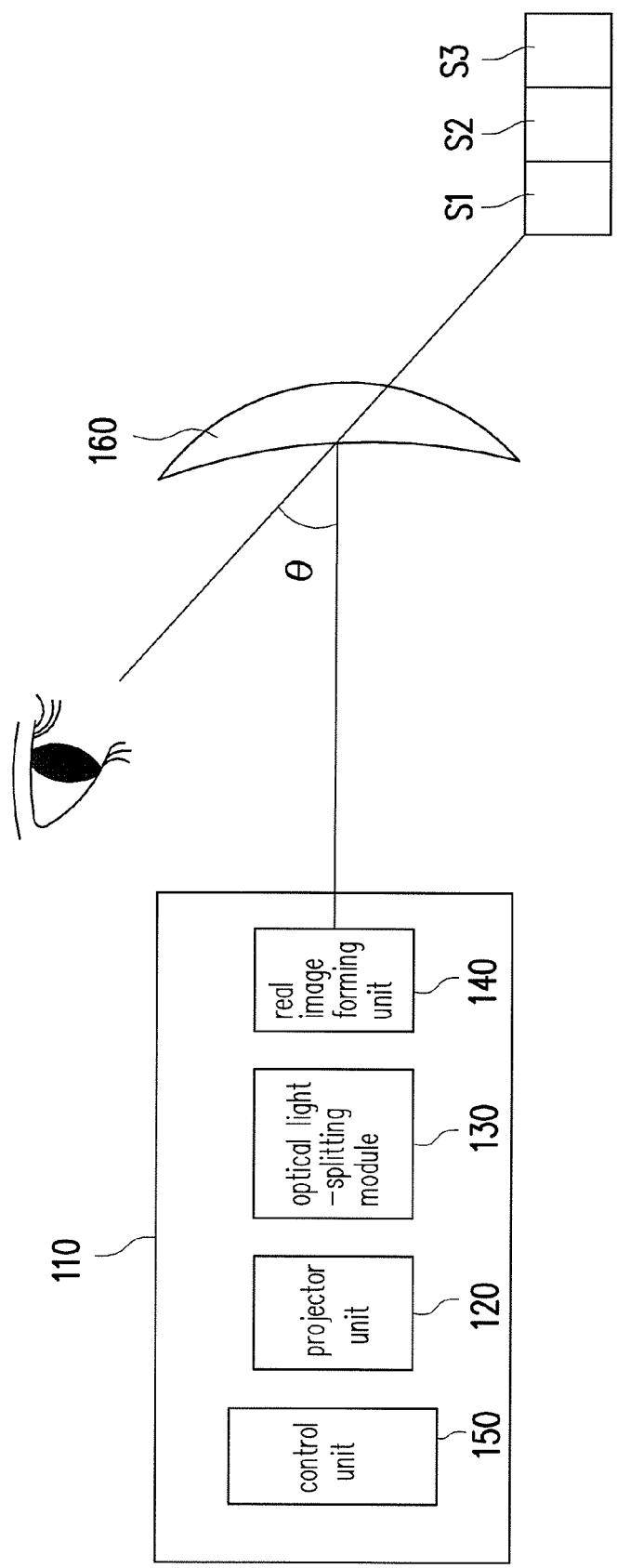
Figure 1C:
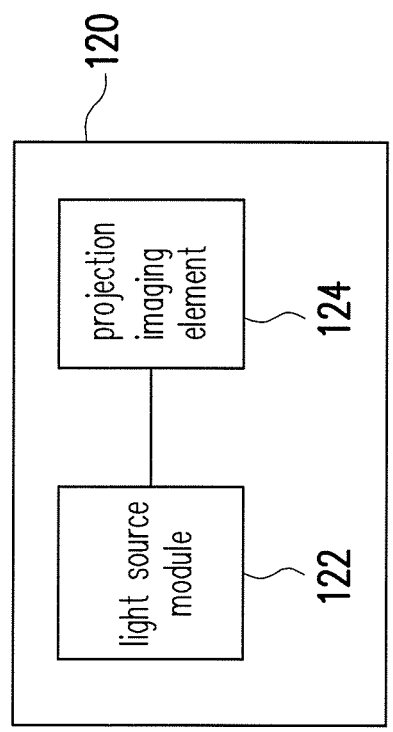
FIG. 1C is a block diagram of a projector unit.
Figure 2:
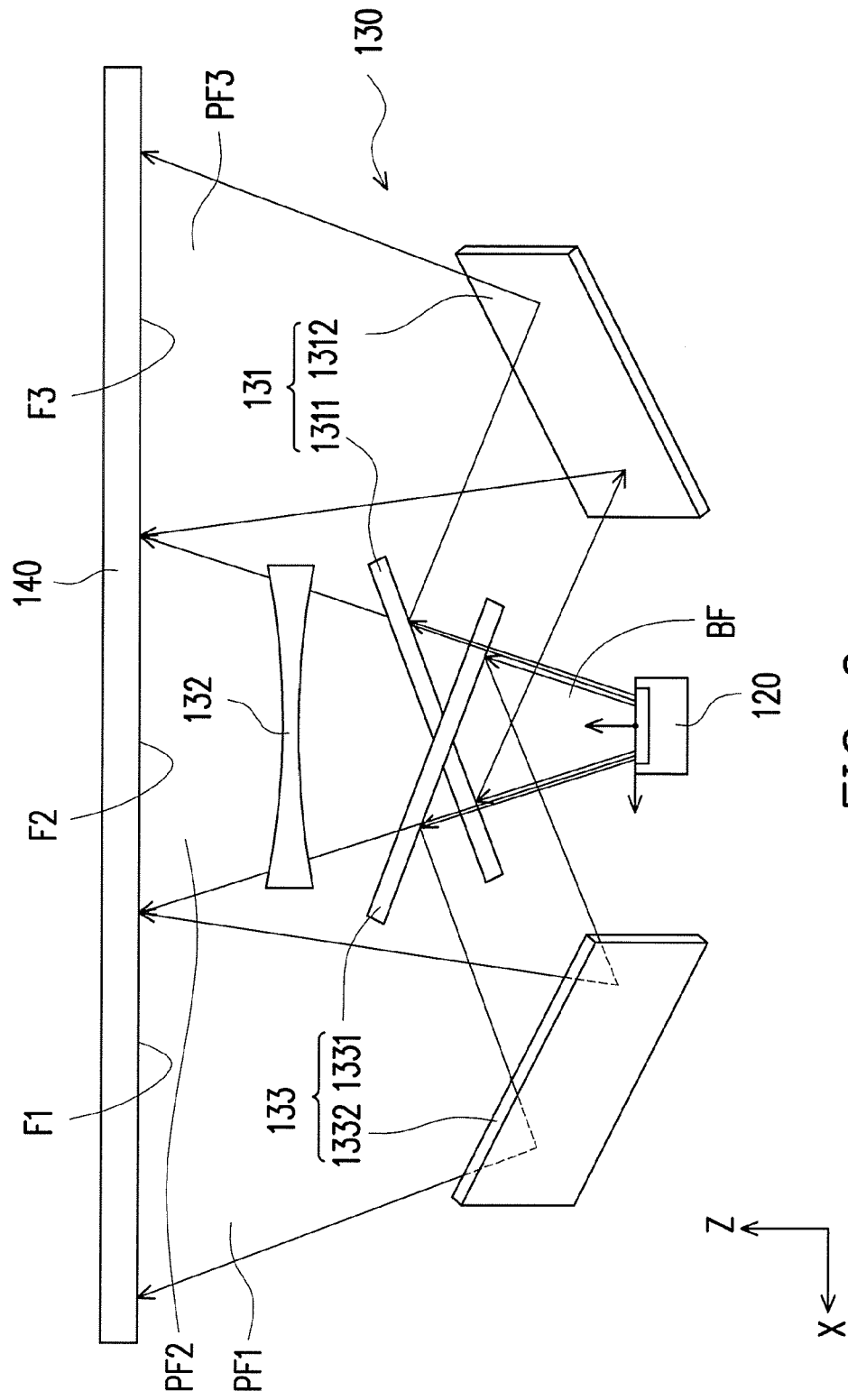
FIG. 2 is a schematic view illustrating a projector unit and an optical light-splitting module shown in FIGS. 1A and 1B.

FIGS. 1A and 1B are schematic views illustrating a projector device according to an embodiment of the disclosure. FIG. 1C is a block diagram of a projector unit 120. FIG. 2 is a schematic view illustrating the projector unit 120 and an optical light-splitting module 130 shown in FIGS. 1A and 1B. FIG. 1A is a top view of the projector device, and FIG. 1B is a side view of the projector device. For the ease of description, X, Y, and Z directions are marked in the drawings of the embodiments of the disclosure. The three directions are perpendicular to each other, and Y direction in FIG. 1A is a direction perpendicular to the sheet of the drawings. A projector device 100 includes a case 110, the projector unit 120, the optical light-splitting module 130, a first image forming element 140, and a control unit 150. In this embodiment, the projector device 100 further includes a second image forming element 160. The projector unit 120, the optical light-splitting module 130, the first image forming element 140, and the control unit 150 may be disposed in the case 110. in the embodiment, the first image forming element 140 may be a real image forming element, and the second image forming element 160 may be a virtual image forming element. In other embodiments, those applying this embodiment may also dispose the first image forming element 140 outside the case 110 or combine the second image forming element 160 with the projector unit 120, the optical light-splitting module 130, the first image forming element 140, and the control unit 150 to be integrated in the case 110 together. The second image forming element 160 is configured to convert a projection image that is a real image into a plurality of virtual display images. In this embodiment, the second image forming element 160 is implemented with a single lens, and the second image forming element 160 is disposed on one side of the first image forming element 140, so as to expand projection images F1 to F3 that are real images to form images S1 to S3. Human eyes in FIG. 1A may view the virtual images S1 to S3 by light beams of the projection images F1 to F3 through the second image forming element 160.

The projector unit 120 is a projector using a laser light source, a light-emitting diode, or other suitable light sources, for example. The projector unit 120 of this embodiment includes a light source module 122 and a projection imaging element 124. The light source module 122 is a laser light source, a light-emitting diode light source or other suitable light sources, for example. The projection imaging element 124 may be one of a micro-electromechanical scanning lens (e.g., MEMS scanner), a liquid crystal display, a liquid crystal on silicon (LCoS) components, and a digital micromirror device (DMD). In this embodiment, the projection imaging element 124 is a micro-electromechanical scanning lens used with a laser light source and is controlled by the control unit 150. The micro-electromechanical scanning lens may be driven by the control unit 150 through a piezoelectric, electrostatic, or electromagnetic operation.

The optical light-splitting module 130 includes a plurality of optical lens sets 131 to 133 (for instance, a first optical lens set 131, a second optical lens set 132, and a third optical lens set 133). The first optical lens set 131, the second optical lens set 132, and the third optical lens set 133 may be arranged according to a light beam forwarding direction of the light beam projecting image BF and reflecting angles respectively, so as to let the light beam projecting image BF may be projected on the first image forming element 140. Each of the optical lens sets includes at least one reflecting mirror or is formed by one of the lenses. In this embodiment, the first optical lens set 131 is formed by two reflecting mirrors 1311 and 1312, the third optical lens set 133 is formed by two reflecting mirrors 1331 and 1332 (e.g., a first reflecting mirror 1331, a second reflecting mirror 1332), and the second optical lens 132 set is formed by a translucent lens. Thus, the optical light-splitting module 130 may form three virtual images S1 to S3 to be split images according to the light beam projecting image BF. In other embodiments, the optical lens set 132 may be replaced by at least one reflecting mirror, a plurality of reflecting mirrors, or a combination structure of a plurality of reflecting mirrors and translucent lens. The optical light-splitting module 130 may form four, five or more virtual images to be the split images according to the light beam projecting image BF, and the number of the virtual images to be the split images is not limited in the embodiment. Alternatively, the optical light-splitting module 130 may omit the optical lens set 132. An actual configuration may be adjusted by those applying this embodiment based on the requirements thereof. The optical lens sets 131-133 are respectively arranged within a range of a path of a light beam projecting image BF, so as to respectively project the projection images F1 to F3 on the first image forming element 140 by transmitting or reflecting the light beam projecting image BF. In this embodiment, since the light beam projecting image BF includes three split images to respectively generate the projection images F1 to F3, the optical light-splitting module 130 is described with the three optical lens sets 131 to 133 as an example. However, those applying this embodiment may adjust the number of the optical lens sets, the structure setting, and the number of split images in the light beam projecting image BF to increase or decrease the number of projection images. For example, projector devices in other embodiments may use the optical light-splitting module 130 to project one to five projection images by using the light beam projecting image BF. In the following, details concerning the relation between the optical light-splitting module 130 and the light beam projecting image BF are described more clearly.

The first image forming element 140 may be an inflexible plate component or a flexible plate component. Taking the flexible plate component as an example, a thickness of the first image forming element 140 may be thinner and similar to a film structure, and the first image forming element 140 may be disposed in the case 110 through adhesion or attached to an external component. In other embodiments, the first image forming element 140 may be adhered to a windscreen panel of a vehicle. If the first image forming element 140 is adhered to a windscreen panel of a vehicle, the user may directly view the projection images F1 to F3 on the first image forming element 140 that are real images without using the second image forming element 160 to generate virtual images at a remote distance. The first image forming element 140 in this embodiment is a transparent diffuser, for example, and may be disposed within a focal distance of the second image forming element 160. The control unit 150 may be a central processing unit, a complex programmable logic device (CPLD), or a field programmable gate array (FPGA), so as to realize the embodiment of the disclosure. In the embodiments of the disclosure, the control unit 150 may transmit image data for forming the light beam projecting image to the projection imaging element 124 by controlling the light source module 122 and the projection imaging element 124.

The projector unit 120 may form the light beam projecting image BF by the light source module 122 and the projection imaging element 124 under the control of the control unit 150. The light beam projecting image BF is projected along Z direction (projecting direction). The light beam projecting image BF may, for example, include three split images. A path of the light beam projecting image BF passes through multiple optical lens sets 131-133 of the optical light-splitting module 130, so as to split the light beam projecting image BF to project a plurality of projection sub-images PF1 to PF3. Also, the projection sub-images PF1 to PF3 are respectively projected to the first image forming element 140 to form the projection images F1 to F3 that are real images. The projection images F1 to F3 that are real images from the first image forming element 140 are converted into the virtual images S1 to S3 through the second image forming element 160, so as to be projected to the eyes of the user. Here, the second image forming element 160 is described in detail. In this embodiment, the second image forming element 160 may be a virtual image forming lens with a concave surface, and an internal side of the concave surface of the virtual image forming lens has a film layer with partially reflection function, for example. The film layer may be coated according to light source (e.g., a light beam wavelength of the light beam projecting image), so that the film layer has higher reflectivity for the wavelength of the light beam (e.g., a reflectivity of the film layer for the beam wavelength of the light beam projecting image is higher than a first predetermined value) and lower light transmittance, and the film layer has lower reflectivity for the beam wavelength not within the beam wavelength of the light beam (e.g., a reflectivity of the film layer for a beam wavelength not within the beam wavelength of the light beam projecting image is lower than a second predetermined value) and higher light transmittance; also, the film layer may perform coating operation with high reflectivity for specific wavelength of laser light source, and the film layer may perform coating operation with high light transmittance for the wavelength of laser light source not within the specific wavelength. In detail, the designed film layer may perform coating operation with higher reflectivity (about 70%) (e.g., the reflectivity of the film layer is higher than the first predetermined value 70%) and lower light transmittance (about 30%) for the red light (R) with the wavelength of 638 nm, the green light (G) with the wavelength of 515 nm, the blue light (B) with the wavelength of 450 nm as the central band wavelength of light sources. In the other wavelength rang of the visible light, for instance, in the light wavelength rang of 400-700 nm, the film layer may perform coating operation with lower reflectivity (about 20%) (e.g., the reflectivity of the film layer is lower than the second predetermined value 20%) and higher light transmittance (about 80%). Such that, the features in the embodiment of the disclosure with high ambient brightness and high HUD image brightness may be achieved at the same time. In other embodiments, the second image forming element 160 may also include two or more optical components, such as including a combination of an imaging lens, a reflective mirror, and a transflective mirror, etc. These optical components may be arranged in the Z-axis direction sequentially. The projection images F1 to F3 that are real images from the first image forming element 140 are projected to form the virtual images S1 to S3 through the second image forming element 160. After the virtual images S1 to S3 passing through the second image forming element 160, the light beam is refracted to the human eyes. Since the images are formed as virtual images, it feels like the images are formed at a remote distance. In other words, the human eyes are able to view the virtual images projected at a remote distance through the second image forming element 160. In this way, a distance between a scene in front of the viewer and the virtual images projected at a remote distance is reduced, thereby relieving the driver from visually switching between long and short distance images. In other embodiments, the projector device 100 may also omit the second image forming element 160. At this time, an image projected from the projector device 100 is a real image projected onto the first image forming element 140. With the design, the first image forming element 140 may be a transparent component, such as a transparent diffuser, or an opaque component, such as a white screen.

Figure 3A:
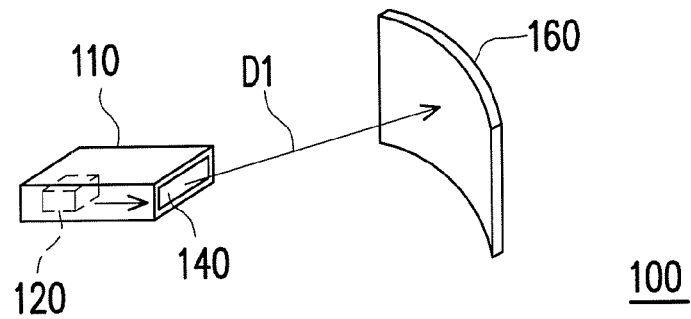
FIGS. 3A to 3E are schematic views respectively illustrating a plurality of arranged configurations between a projector device, a projector unit, a first image forming element, and a second image forming element.
Figure 3B:
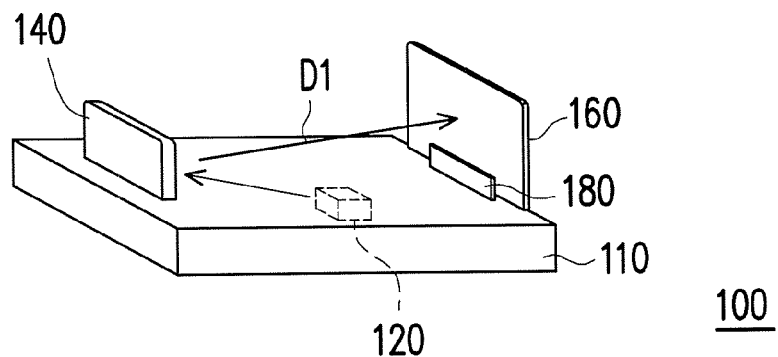
Figure 3C:
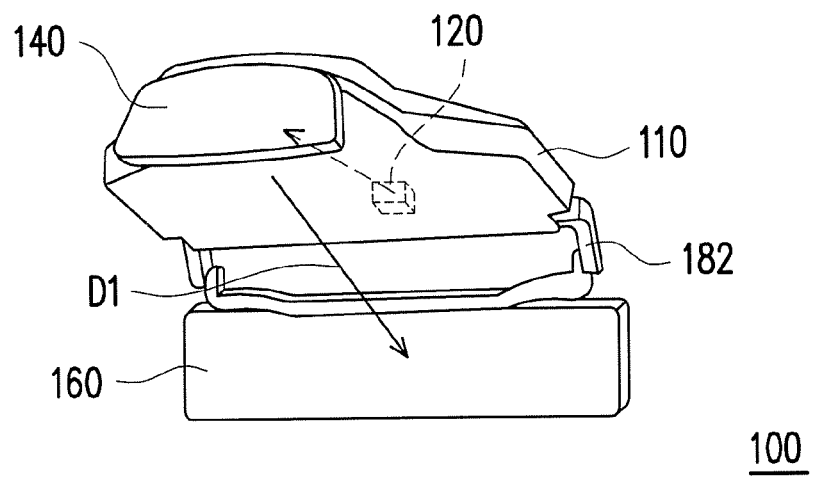
Figure 3D:
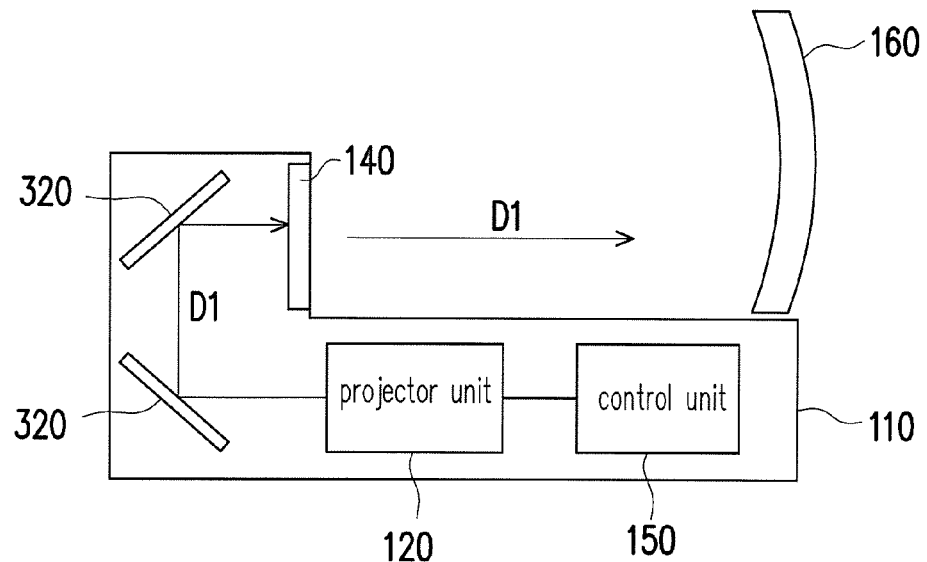
Figure 3E:
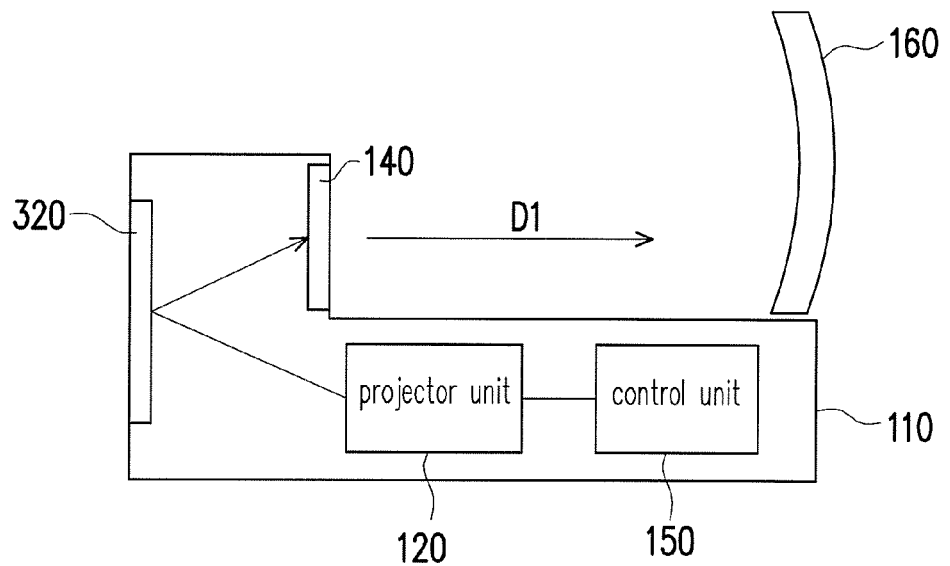

In this embodiment, the second image forming element 160 is placed one side of the first image forming element 140, and not at a position the same as a position where the optical light-splitting module 130 is disposed. In FIG. 1B, it has an angle θ (about 10 to 90 degrees) between a projection direction of the light beam projected to the second image forming element 160 by the projector device 100 and a visual direction of the user, and the angle θ may be adjusted by those applying this embodiment based on the requirements thereof. To more clearly describe a plurality of embodiments compliant with the spirit of the disclosure, FIGS. 3A to 3E are described below to explain relative configurations of the case 110, the projector unit 120, the first image forming element 140, and the second image forming element 160 of the projector device 100. FIGS. 3A to 3E are schematic views respectively illustrating a plurality of arranged configurations between the projector device 100, the projector unit 120, the first image forming element 140, and the second image forming element 160. As shown in FIG. 3A, the second image forming element 160 may be separated from the case 110. In addition, the second image forming element 160 is disposed in a projecting direction D1 of the projection images F1 to F3 of the first image forming element. As shown in FIG. 3B, the second image forming element 160 may also be disposed on the case 110 by using a pivot 180, and the second image forming element 160 may be disposed in the projecting direction D1 of the first image forming element. As shown in FIG. 3C, the second image forming element 160 may be connected to the case 110 by using a rod connecting mechanism 182, and the second image forming element 160 is disposed in the projecting direction D1 of the real image forming unit. In FIGS. 3D to 3E, the first image forming element 140 is arranged at the case 110 of the projector device 100. The projector unit 120, the control unit 150 and reflection element 320 may be arranged in the inside space of the case 110, and the first image forming element 140 may be arranged within a reflected light path with the light beam produced by the projector unit 120 and formed by the reflected light beam projecting image 320. The first image forming element 140 of FIGS. 3D to 3E may be a translucent component or an optical refractive component. The second image forming element 160 may be arranged on the outside space of the case 110 (e.g., on the top of the case 110). In other embodiments, the second image forming element 160 may be arranged with connecting rods on one side the case 110, or the second image forming element 160 may be inverted 180 degrees to arrange in a sun visor of the vehicle, so the second image forming element 160 may be arranged under the bottom of the case 110. Those applying this embodiment may also dispose and adjust the positions of the second image forming element 160 related to the case 110 based on the requirements thereof. Thus, the control unit 150 controls projector unit 120 for generating a light beam, and the light beam generated by the projector unit 120 is reflected along the projecting direction D1 by one reflection element 320

(e.g., reflection element 320 in FIG. 3E) or multiple reflection elements 320 (e.g., two reflection elements 320 in FIG. 3D) once or more times, so that the light beam to be reflected is passed through from the first image forming element 140 to the second image forming element 160. By the above manner for reflecting the light beam and then making the light beam passing through the first image forming element 140, the projector device 100 of FIGS. 3D to 3E may have a smaller volume and a higher brightness of the images at the same time. The projector device 100 of FIGS. 3A, 3D and 3E are optical transparent projection devices, such that the light beam is directly projected thoroughly form the first image forming element 140 to the second image forming element 160 in a straight line manner. In other words, the first image forming element 140 is arranged within the light path of the beam projecting image to be reflected, so as to form the projection image by projecting the beam projecting image to the first image forming element 140. The distance between the second image forming element 160 and first image forming element 140 is smaller than the focal distance of the second image forming element 160 (e.g., a concave lens), so that the projection image is formed a virtual image on the second image forming element 160. In this way, the images of the optical transparent projection device has at least the one of the advantages of high brightness. The projector device 100 of FIGS. 3B and 3C are optical refractive projection devices, which may generate the light beam to arrive the first image forming element 140, so that a projecting image is formed on the first image forming element (e.g., a projection curtain), then the projector device 100 of FIGS. 3B and 3C reflects the light beam with the projecting image to the second image forming element 160 for forming the virtual image, wherein the distance between the second image forming element and the first image forming element is smaller than the focal distance of the second image forming element (e.g., a concave lens). The image is formed after the beam projecting image is projected by the first image forming element 140, instead of the image is formed after the light beam is passed through the first image forming element. Comparing to the optical transparent projection devices and the optical refractive projection devices, the optical transparent projection devices may let the light beam to project indirectly from the first image forming element 140 to the second image forming element 160 by optical reflecting, so that the optical transparent projection devices have a smaller volume. Please refer to FIGS. 3A to 3E, in the situation that the projector device 100 projects the beam projecting image and splits the beam projecting image in the multiple projection sub-images, the horizontal projection width of the beam projecting image generated by the projector unit 120 may be smaller than the vertical projection width of the beam projecting image. However, in the situation that the projector device 100 may not project the beam projecting image and split the beam projecting image in the multiple projection sub-images, the horizontal projection width of the beam projecting image generated by the projector unit 120 may be bigger than or equal to the vertical projection width of the beam projecting image. Whereby, the projector device 100 in the embodiments of the disclosure may be applied to different usage scenarios and demands.

Figure 4:
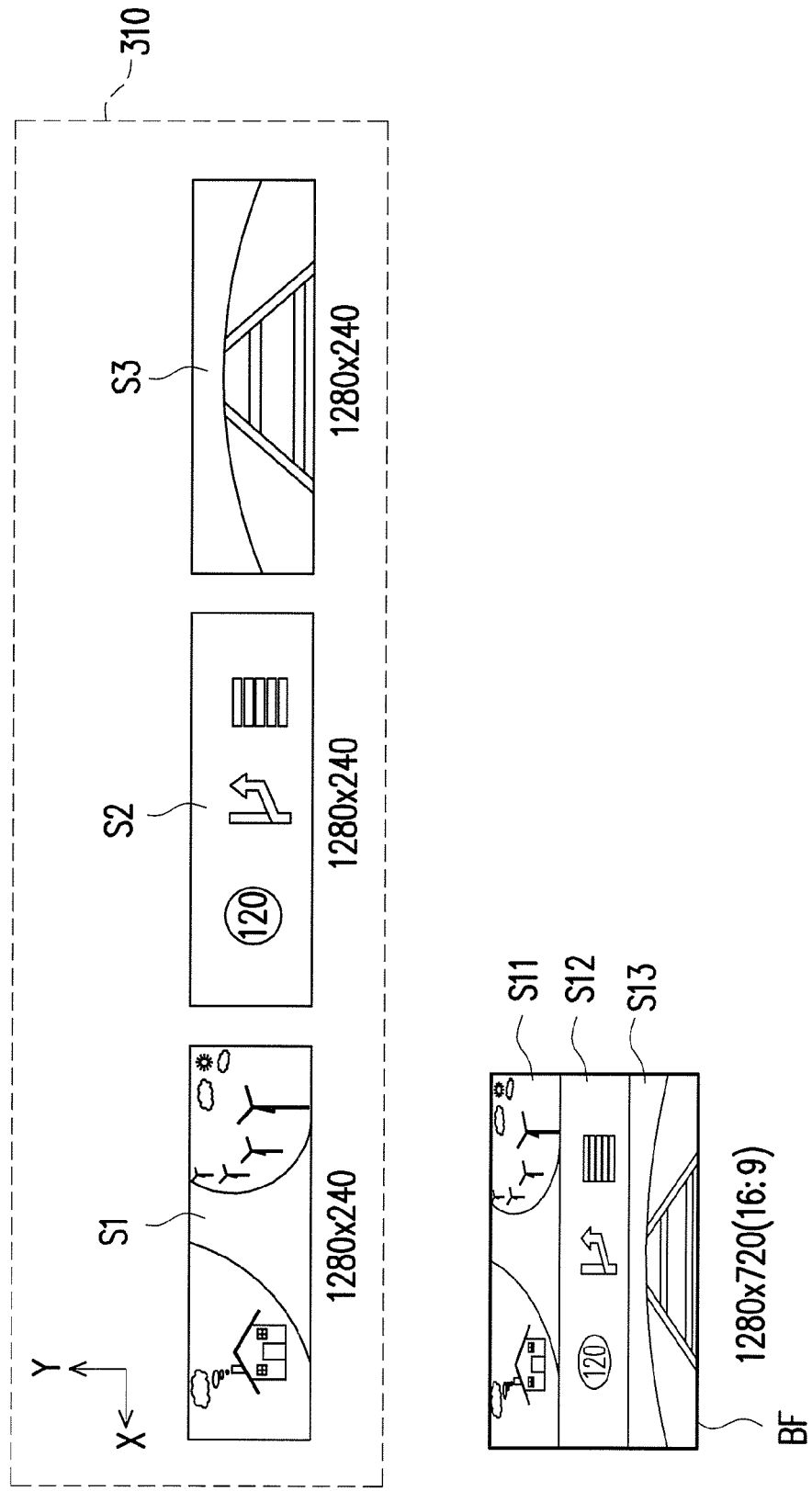
FIG. 4 is a schematic view illustrating a light beam projecting image, split images, and virtual images of a projector device.

It should be noted that since the light beam projecting image BF of the projector unit 120 usually adopts a rectangular pixel resolution/display aspect ratio, such as a light beam projecting image with a pixel resolution of 1280×720 and a display aspect ratio of 16:9, the projection images F1 to F3 generated after the light beam projecting image BF projected by the projector unit 120 is processed by the projector device 100 and the optical light-splitting module 130 become very long and narrow. FIG. 4 is a schematic view illustrating the light beam projecting image BF, the split images, and the virtual images S1 to S3 of the projector unit 120. Referring to FIGS. 1A and 4 together, the light beam projecting image BF has three split images S11, S12, and S13. In addition, after the light beam projecting image BF is projected and split by the projector device 100 and the optical light-splitting module 130 thereof, the virtual images S1 to S3 are generated in a display area 310 (e.g., the windscreen panel in the front of the vehicle) of the vehicle. In this embodiment, the split images S11, S12, and S13 of the light beam projecting image BF are arranged along a first direction (e.g., Y direction), and the projection images F1 to F3 that are real images and the virtual images S1 to S3 are arranged along a second direction (e.g., X direction). In addition, the first direction and the second direction are different. It should be noted herein that the first direction is a vertical direction, and the second direction is a horizontal direction.

As clearly shown in FIG. 4, a pixel resolution of each of the virtual images S1 to S3 is 1280×240, and a display aspect ratio thereof is almost 5:1, making a horizontal resolution and a vertical resolution of each of the virtual images S1 to S3 overly divergent and thus making an image quality thereof degraded. Also, since the virtual images are too narrow and long, the virtual images S1 and S3 at sides are not within an optical viewing angle of the viewer. In other words, when the user views the leftmost or rightmost virtual image S1 or S3, since an area of the second image forming element limits an eyebox of the virtual image, the user needs to move his/her head leftward or rightward to see the virtual image S1 or S3. Such limitation is still likely to result in car accidents and against the original idea of the HUD. Also, since the first image forming element 140 is limited by a width of the case 110, when the width of the case 110 is not enough to form the split images S11, S12, and S13 on the first image forming element 140, a leftmost portion of the virtual image S1 and a rightmost portion of the virtual image S3 are unable to be formed. With the aforesaid issues, the projector device 100 shown in FIG. 1 is still unable to display images with a most desirable image aspect ratio and pixel resolution when the projector device 100 functions as a HUD in a vehicle, and may cause disturbance to the user.

Figure 5:
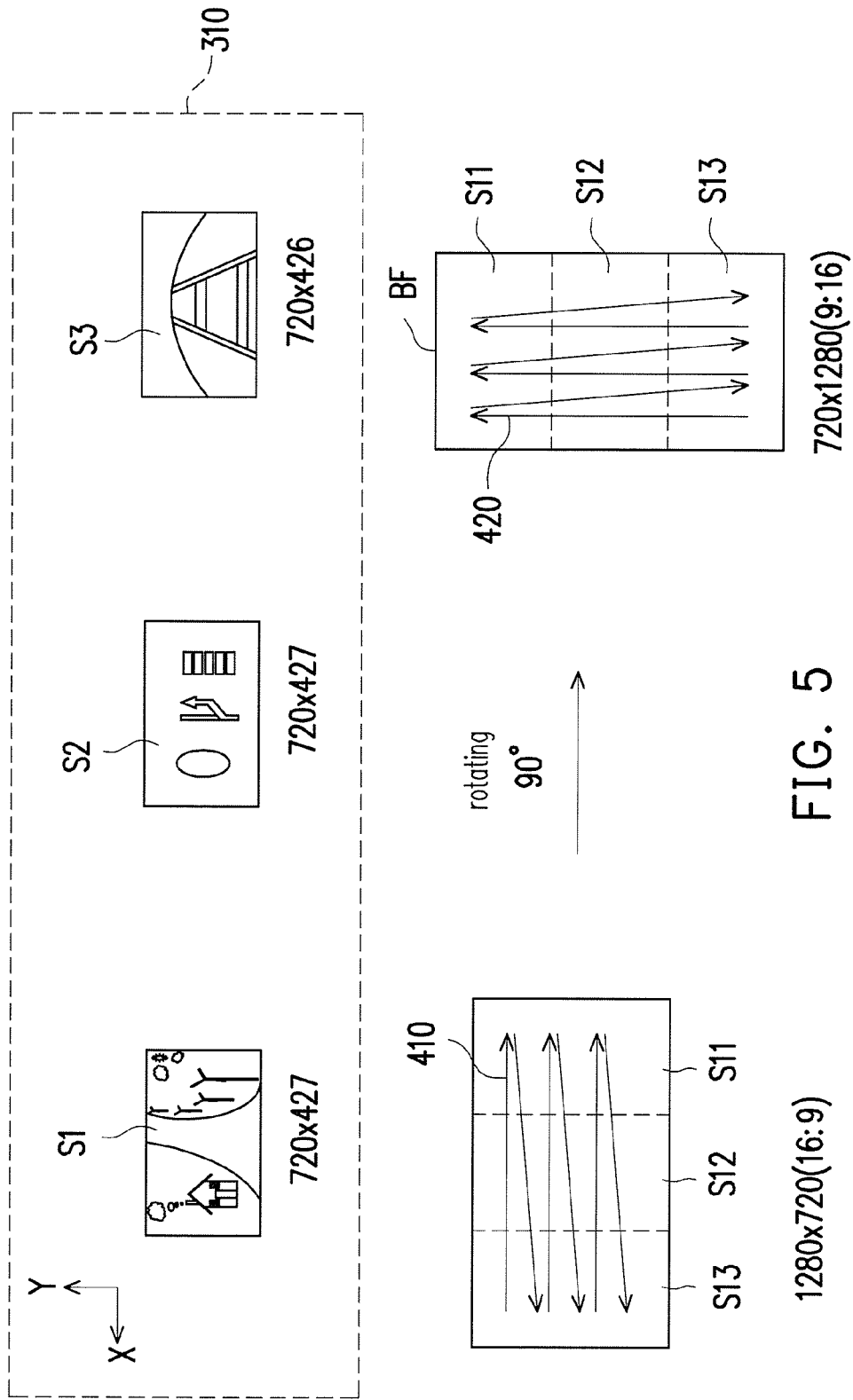
FIG. 5 is a schematic view illustrating a light beam projecting image, split images, and virtual images according to an embodiment of the disclosure.

Thus, the projector device 100 according to the embodiments of the disclosure optimizes image aspect ratios and the pixel resolutions of the virtual images S1 to S3 by adjusting a position angle of the projection imaging element 124 in the projector unit 120. Specifically, since the light beam projecting image is projected along Z direction (projecting direction), the imaging element (e.g., scanning lens) in the projector unit 120 according to the embodiments of the disclosure is designed to adjust a global placement of the imaging element from its normal placement to a placement configured by rotating the imaging unit a predetermined angle (e.g., 90 degrees) on a plane formed by X direction and Y direction (i.e., a vertical plane of the projecting direction). FIG. 5 is a schematic view illustrating the light beam projecting image, the split images, and the virtual images S1 to S3 according to an embodiment of the disclosure. In this embodiments, the split images S11, S12, and S13 of the light beam projecting image BF are arranged along the first direction (e.g., Y direction), and the virtual images S1 to S3 are arranged along the second direction (e.g., X direction). By rotating the imaging element, a horizontal projection width of the light beam projecting image BF (i.e., a horizontal pixel width, such as 720) becomes smaller than a vertical projection width of the light beam projecting image BF (i.e., a vertical pixel width, such as 1280). Accordingly, the respective pixel resolutions of the virtual images S1 and S2 become 720×427, and the pixel resolution of the virtual image S3 becomes 720×426, and the display aspect ratio of each of the virtual images S1 to S3 becomes almost 5:3 (approximately equal to 1.69:1), making a difference between the horizontal resolution and the vertical resolution of the virtual images S1 to S3 close to a ratio of a normal panel or output image. Thus, in the embodiment of the disclosure, by rotating the imaging element (scanning lens) 90 degrees, the optimized display aspect ratio and image resolution of each of the virtual images S1 to S3 are obtained, and it is not necessary to further adjust other parts in a hardware configuration. In another embodiment, the projector unit may be directly rotated 90 degrees to similarly obtain the optimized display aspect ratio and pixel resolution of each of the virtual images S1 to S3 of the projector device 100.

Besides, since the scanning lens in the projector unit 120 is rotated 90 degrees, the imaging element (scanning lens) in the projector unit 120 is modified from horizontal line scanning (as indicated by arrows 410) into vertical line scanning (as indicated by arrows 420). Accordingly, since the laser light source is used as the light source module and the projection imaging element 124 is adjusted by using the control unit 150 in this embodiment of the disclosure, the user may drive the light source module in the projector unit 120 through the control unit 150, so as to control a laser dot speed of the light beam to the light beam projecting image BF in the vertical direction, thereby increasing a vertical resolution of the projection imaging element. For example, the control unit 150 may increase pixels in a track of each vertical scanning line from the original 1280 dots to 1620 dots by making use the speeded spotting of the laser light source. In other words, the resolution of each virtual image becomes 720×540, i.e., a ratio of 4:3. If the number of dots is further increased, the pixel resolution of each of the virtual images S1 to S3 in the vertical direction may be further increased to allow the user to view information displayed in the virtual images S1 to S3 more clearly. Using the laser light source as an imaging light source of the projector device 100 further allows the virtual images S1 to S3 to have a most preferable contrast and a high brightness while makes the device miniaturized. Also, it is not necessary to perform a focusing process. Besides, an optical image structure using laser imaging is simpler. The projector device 100 may be realized without the need of an additional complicated mechanism, so the cost is lower. In the following, details concerning the relation between the optical light-splitting module 130 of FIG. 2 and each of the split images S11, S12 and S13. Referring to FIG. 1A and FIG. 5 accordingly, the reflecting mirror 1331 of the third optical lens set 133 and the reflecting mirror 1311 of the first optical lens set 131 may be overlapped and arranged along a direction of Y directions. The reflecting mirror 1331 is positioned above the reflecting mirror 1311. The angle between the reflecting mirror 1331 and the X direction is about plus or minus 15 or plus or minus 75 degrees, the angle between the reflecting mirror 1311 and the X direction is about plus or minus 15 or plus or minus 75 degrees, and the reflecting mirror 1331 and the reflecting mirror 1311 presents cross-shaped mutually in the plan view of FIG. 1. The third optical lens set 133 reflects a first part of the light beam projecting image BF formed by the projector unit 120 (that is, part of the light beam projecting image BF corresponding to the split images S11) to the first image forming element 140 according to the sequence of the reflecting mirrors 1331 and 1332, so as to form the projection images F1, and to form the virtual images S1 on the second image forming element 160. The second optical lens set 132 reflects a second part of the light beam projecting image BF formed by the projector unit 120 (that is, part of the light beam projecting image BF corresponding to the split images S12) to the first image forming element 140, or passes the second part of the light beam projecting image BF through the first image forming element 140, so as to form the projection images F2, and to form the virtual images S2 on the second image forming element 160. The first optical lens set 131 reflects a third part of the light beam projecting image BF formed by the projector unit 120 (that is, part of the light beam projecting image BF corresponding to the split images S13) to the first image forming element 140 according to the sequence of the reflecting mirrors 1311 and 1312, so as to form the projection images F3, and to form the virtual images S3 on the second image forming element 160.

Figure 6A:
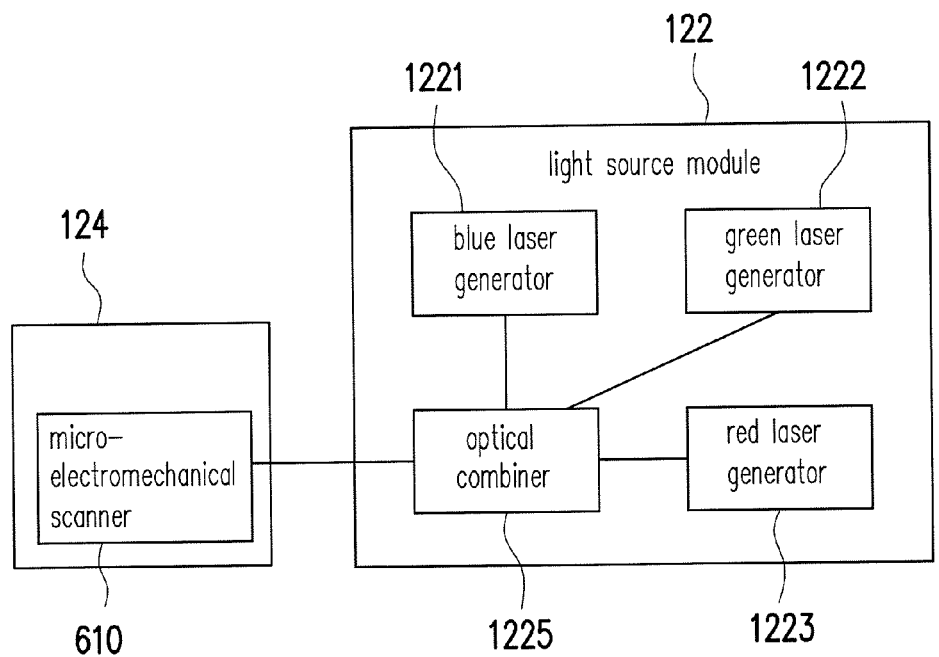
FIG. 6A is a detailed block diagram of a projector unit 120.

FIG. 6A is a detailed block diagram of the projector unit 120. The projector unit 120 includes the light source module 122 and the projection imaging element 124. The light source module 122 may be composed of a blue laser generator 1221, a green laser generator 1222, a red laser generator 1223 and an optical combiner 1225. The control unit 150 may control the blue laser generator 1221 for generating the blue laser, control the green laser generator 1222 for generating the green laser, and control the red laser generator 1223 for generating the red laser respectively, and control the optical combiner 1225 to integrate the output for generate the desired images. In the embodiment, the projection imaging element 124 is micro-electromechanical scanner (MEMS) 610. The MEMS scanner 610 of the projection unit 120 is adjusted from its original placement and rotated by a predetermined angle (90 degrees) along a vertical plane of the projecting direction, so as to achieve the purpose of an embodiment of the present disclosure.

Referring to FIG. 1A again, since the projector device 100 uses laser light as the light source, a laser driving signal of the control unit 150 to the light source module is at a speed as fast as hundreds of megahertz. Thus, in a conventional product that performs high-speed modulation to a laser light source, such as a laser optical communication module or the projector device 100 of this embodiment that performs high-speed modulation with laser, the control unit 150 needs to be disposed as close to the projector unit 120 as possible in the conventional circuit design, so as to prevent transmission errors of high frequency signals. However, the projector unit 120, the optical light-splitting module 130 and a substrate for mounting the control unit 150 then need to be disposed in the case 110, and the size of the projector device 100 is unable to be reduced. Thus, to reduce the size of the projector device 100, the projector unit 120 and the optical light-splitting module 130 form a device body, and a longer transmission wire is used to connect the projector unit 120 and the control unit 150 in the embodiment of the disclosure, such that the device body may be selectively disposed at a space adjacent to or different from a space of the control unit 150. In this way, the device body formed of the projector unit 120 and the optical light-splitting module 130 does not need to include the substrate of the control unit 150, and the control unit 150 may be connected to the projector unit 120 through a longer soft cable (e.g., 1 to 4 m) without signal delay. In this embodiment, the control unit 150 may be built in an audio-visual system installed in the vehicle and connected to the projector unit 120 disposed inside the vehicle (e.g., at positions such as the car dashboard, rear view mirrors, or sun visor, etc.) through the soft cable or by adopting a wireless transmission technology, so as to reduce the size of the projector device 100. In this embodiment, since control signals and power need to be transmitted between the control unit 150 and the projector unit 120, the wireless transmission technology may include wireless transmission of signal controls and wireless power transmission technology.

Figure 6B:
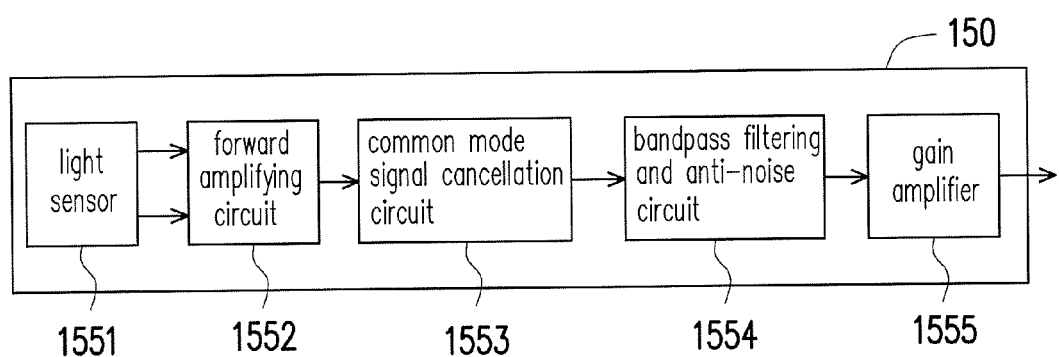
FIG. 6B is a detailed block diagram of a control unit 150.

FIG. 6B is a detailed block diagram of the control unit 150. In detail, referring to FIG. 6B, the control unit 150 in this embodiment of the disclosure includes a light sensor 1551, a forward amplifying circuit 1552, a common mode signal cancellation circuit 1553, a bandpass filtering and anti-noise circuit 1554, and gain amplifier 1555. The light sensor 1551 uses a differential output high frequency optical sensor to reduce errors during signal transmission by using the output of high-speed differential signals. The forward amplifying circuit 1552 makes use of a characteristic of a differential signal to amplify a differential mode signal, and makes use of an active filter to eliminate common mode noises. In addition, the control unit 150 has the bandpass filtering and anti-noise circuit 1554 with high sensitivity and the gain amplifier 1555, which not only performs an amplitude amplifying adjustment to signal amplitude attenuation due to long distance transmission but also aims at finding a balance point between signal amplitude amplification and an operational bandwidth at the same time. Also, timing alignment of the control unit 150 is specifically designed in this embodiment of the disclosure. In the projector device, signal transmission and functional processing are performed through synchronous sampling. If the signal delay after long distance transmission is greater than a system synchronization time (12.5 ns), a control process of the control unit 150 may go erroneous. Thus, the control unit 150 needs to be provided with a timing alignment logic circuit to prevent signal delay. Specifically, the timing alignment logic circuit may measure a delay time of signals due to long distance transmission in advance and record time required for the laser to be projected to the optical sensor. Then, a phase-locked loop (PLL) element is used to generate a clock greater than 80 MHz, such that the timing alignment logic circuit detects a phase of an optical sensing signal, and compensates for a phase error in a logic pipe at the next stage, so as to maintain a control stability of projection synchronization.

In view of the foregoing, the projector device of the embodiments of the disclosure has the optical light-splitting module, so as to generate the projection images by using one image source. In addition, the projector device is able to provide projection images with preferable image aspect ratios and resolutions by adjusting the projecting angle of the projector unit.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A projector device, comprising:
a projector unit, forming a light beam projecting image, wherein a horizontal projection width of the light beam projecting image is smaller than a vertical projection width of the light beam projecting image;
an optical light-splitting module, projecting one or a plurality of projection sub-images according to the light beam projecting image; and
a first image forming element, wherein the projection sub-images are respectively projected to the first image forming element to form one or a plurality of projection images,
wherein the light beam projecting image comprises a plurality of split images, and the optical light-splitting module comprises:
a first optical lens set comprising a first reflective mirror and a second reflective mirror;
a second optical lens set; and
a third optical lens set comprising a third reflective mirror and a fourth reflective mirror,
wherein the third reflective mirror of the third optical lens set overlaps with the first reflective mirror of the first optical lens set in a first direction, the third reflective mirror of the third optical lens set forms with the first reflective mirror of the first optical lens set in a second direction an angle from plus or minus 15 degrees to plus or minus 75 degrees, the third reflective mirror and the first reflective mirror present cross-shaped mutually in a plane formed by the second direction and a third direction, and the first direction, the second direction and the third direction are different from each other,
wherein the third reflective mirror and the fourth reflective mirror of the third optical lens set are configured to project a first part of the light beam projecting image to the first image forming element to form a first projection sub-image,
the second optical lens set is configured to project a second part of the light beam projecting image through the first image forming element to form second projection sub-image, and
the first reflective mirror and the second reflective mirror of the third optical lens set are configured to project a third part of the light beam projecting image to the first image forming element to form a third projection sub-image.

2. The projector device as claimed in claim 1, wherein the split images are arranged along the first direction, the projection images are arranged along the second direction.

3. The projector device as claimed in claim 1, wherein the first direction is a vertical direction, and the second direction is a horizontal direction.

4. The projector device as claimed in claim 1, wherein the first optical lens set, the second optical lens set and the third optical lens set comprise at least one reflective mirror or at least one lens.

5. The projector device as claimed in claim 1, wherein the projector unit comprises:
a light source module for generating a light beam; and
an projection imaging element, forming the light beam projecting image with the light beam.

6. The projector device as claimed in claim 5, wherein the light source module is a laser light source or a light-emitting diode light source.

7. The projector device as claimed in claim 5, wherein the light beam projecting image of the projection imaging element has a projecting direction, and
when the projector device splits the light beam projecting image to project the first projection sub-image, the second projection sub-image and the third projection sub-image, a global placement of a projecting angle of the projection imaging element is rotated a predetermined angle along a vertical plane of the projecting direction, such that the horizontal projecting width of the light beam projecting image is smaller than the vertical projecting width of the light beam projecting image.

8. The projector device as claimed in claim 5, further comprising:
a control unit, coupled to the light source module and the projection imaging element of the projector unit and transmitting image data for forming the light beam projecting image to the projection imaging element by controlling the light source module and the projection imaging element,
wherein the control unit drives the light source module to adjust a dot speed of the light beam to the light beam projecting image in a vertical direction.

9. The projector device as claimed in claim 5, wherein the projector unit and the optical light-splitting module form a device body, and
the device body is selectively disposed in a space adjacent to or different from a space of the control unit, and the projector unit and the control unit are connected through a wire or by using a wireless transmission technology.

10. The projector device as claimed in claim 5, wherein the projection imaging element is one of a micro-electromechanical scanning lens, a liquid crystal display, a liquid crystal on silicon unit, and a digital micromirror device.

11. The projector device as claimed in claim 10, wherein the micro-electromechanical scanning lens is driven through a piezoelectric, electrostatic, or electromagnetic operation.

12. The projector device as claimed in claim 1, wherein the first image forming element is a transparent diffuser, and the projector device is a head up display for vehicles.

13. The projector device as claimed in claim 1, further comprising:
a second image forming element, converting the projection images that are real images into a plurality of virtual display images,
wherein the first projection sub-image forms a first virtual display image in the second image forming element, the second projection sub-image forms a second virtual display image in the second image forming element and the third projection sub-image forms a third virtual display image in the second image forming element.

14. The projector device as claimed in claim 13, wherein the second image forming element is a virtual image forming lens with a concave surface, an internal side of the concave surface of the virtual image forming lens has a film layer with partially reflection function, wherein the film layer is coated according to a beam wavelength of the light beam projecting image, so that a reflectivity of the film layer for the beam wavelength of the light beam projecting image is higher than a first predetermined value, and a reflectivity of the film layer for a beam wavelength not within the beam wavelength of the light beam projecting image is lower than a second predetermined value.

15. A projector device, comprising:
a projector unit, forming a light beam projecting image;
an optical light-splitting module, projecting light beam projecting image to form one or more projection images;
a reflection element, reflecting a light beam with the light beam projecting image;
a first image forming element arranged within a light path of the reflected light beam projecting image, so that of the light beam projecting image is projected through the first image forming element to form one or more projection image; and
a second image forming element arranged within the light path of the reflected light beam projecting image, so that the projection images are formed a first virtual image, a second virtual image and a third virtual image on the second image forming element,
wherein the light beam projecting image comprises a plurality of split images, and the optical light-splitting module comprises:
a first optical lens set comprising a first reflective mirror and a second reflective mirror;
a second optical lens set; and
a third optical lens set comprising a third reflective mirror and a fourth reflective mirror,
wherein the third reflective mirror of the third optical lens set overlaps with the first reflective mirror of the first optical lens set in a first direction, the third reflective mirror of the third optical lens set forms with the first reflective mirror of the first optical lens set in a second direction an angle from plus or minus 15 degrees to plus or minus 75 degrees, the third reflective mirror and the first reflective mirror present cross-shaped mutually in a plane formed by the second direction and a third direction, and the first direction, the second direction and the third direction are different from each other,
wherein the third reflective mirror and the fourth reflective mirror of the third optical lens set are configured to project a first part of the light beam projecting image to the first image forming element to form a first projection sub-image,
the second optical lens set is configured to project a second part of the light beam projecting image through the first image forming element to form second projection sub-image, and
the first reflective mirror and the second reflective mirror of the third optical lens set are configured to project a third part of the light beam projecting image to the first image forming element to form a third projection sub-image.

16. The projector device as claimed in claim 15, wherein the first image forming element is a transparent element, and the projector device further comprising:
a case, wherein the projector unit and the reflection element is arranged in an inside space of the case, the first image forming element is arranged on the case, so that the light beam with the light beam projecting image is passed through the first image forming element, and
the second image forming element is arranged on an outside of the case, so that a light beam passed through the first image forming element is formed the first virtual image, the second virtual image and the third virtual image on the second image forming element,
wherein the first projection sub-image forms a first virtual display image in the second image forming element, the second projection sub-image forms a second virtual display image in the second image forming element and the third projection sub-image forms a third virtual display image in the second image forming element.

17. The projector device as claimed in claim 15, further comprising:
a control unit, coupled to the projector unit, transmitting image data for forming the light beam projecting image to the projector unit by controlling the projector unit, wherein a case is selectively disposed in a space adjacent to or different from a space of the control unit, and the projector unit and the control unit are connected through a wire or by using a wireless transmission technology.

18. The projector device as claimed in claim 15, wherein the second image forming element is a virtual image forming lens with a concave surface, an internal side of the concave surface of the virtual image forming lens has a film layer with partially reflection function, wherein the film layer is coated according to a beam wavelength of the light beam projecting image, so that a reflectivity of the film layer for the beam wavelength of the light beam projecting image is higher than a first predetermined value, and a reflectivity of the film layer for a beam wavelength not within the beam wavelength of the light beam projecting image is lower than a second predetermined value.

* * * * *